US009639947B2

(12) United States Patent
Atif et al.

(10) Patent No.: US 9,639,947 B2
(45) Date of Patent: May 2, 2017

(54) METHOD AND OPTICAL SYSTEM FOR DETERMINING A DEPTH MAP OF AN IMAGE

(71) Applicant: SONY CORPORATION, Minato-ku (JP)

(72) Inventors: Muhammad Atif, Stuttgart (DE); Muhammad Siddiqui, Esslingen am Neckar (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/391,927

(22) PCT Filed: Mar. 20, 2013

(86) PCT No.: PCT/EP2013/000847
§ 371 (c)(1),
(2) Date: Oct. 10, 2014

(87) PCT Pub. No.: WO2013/156101
PCT Pub. Date: Oct. 24, 2013

(65) Prior Publication Data
US 2015/0125070 A1  May 7, 2015

(30) Foreign Application Priority Data
Apr. 18, 2012 (EP) .................... 12002701

(51) Int. Cl.
*G06K 9/00* (2006.01)
*G06T 7/00* (2017.01)

(52) U.S. Cl.
CPC .. *G06T 7/0069* (2013.01); *G06T 2207/10024* (2013.01); *G06T 2207/20028* (2013.01);
(Continued)

(58) Field of Classification Search
None
See application file for complete search history.

(56) References Cited

U.S. PATENT DOCUMENTS 5,785,651 A   7/1998   Kuhn et al.
6,175,754 B1  1/2001   Scholl et al.
(Continued)

FOREIGN PATENT DOCUMENTS

| CN | 1722176 A | 1/2006 |
| JP | 2011-085432 A | 4/2011 |
| WO | 2003/052342 A2 | 6/2003 |

OTHER PUBLICATIONS

Jaeguyn Lim, et al., "Robust Local Restoration of Space-Variant Blur Images", Proceedings of SPIE-IS&T Electronic Imaging, vol. 6817, XP055070794, Feb. 14, 2008, pp. 68170S-1-68170S-14.*

(Continued)

*Primary Examiner* — Fred Hu
(74) *Attorney, Agent, or Firm* — Oblon, McClelland, Maier & Neustadt, L.L.P.

(57) ABSTRACT

A method and optical system for determining a depth map of an image, the method including: determining a first focus measure of a first color in at least one region of the image; determining a second focus measure of a second color in the at least one region of the image; determining a ratio of the first and the second focus measure; and determining the depth map based on a ratio of the first and second focus measure.

20 Claims, 5 Drawing Sheets

(52) U.S. Cl.
CPC ............... *G06T 2207/20032* (2013.01); *G06T 2207/20112* (2013.01)

(56) References Cited

U.S. PATENT DOCUMENTS

| | | | |
|---|---|---|---|
| 7,626,769 B2 | 12/2009 | Olmstead et al. | |
| 2004/0165090 A1 | 8/2004 | Ning | |
| 2006/0029284 A1* | 2/2006 | Stewart .................. | G02B 7/365 382/255 |
| 2010/0201682 A1* | 8/2010 | Quan .................. | G06K 9/00704 345/419 |
| 2011/0286634 A1 | 11/2011 | Imamura | |

OTHER PUBLICATIONS

Pangea Search Report issued Dec. 9, 2011 in PAE11-068EUTV.
International Search Report issued Jul. 22, 2013 in PCT/EP2013/000847 filed Mar. 20, 2013.
Jaeguyn Lim, et al., "Robust Local Restoration of Space-Variant Blur Image" Proceedings of SPIE-IS&T Electronic Imaging, vol. 6817, XP055070794, Feb. 14, 2008, pp. 68170S-1-68170S-14.
Frederic Guichard, et al., "Extended depth-of-field using sharpness transport across color channels" Proceedings of SPIE, Digital Photography, vol. 7250, XP002676338, Jan. 19, 2009, 13 Pages.
Josep Garcia, et al., "Chromatic Aberration and Depth Extraction" Pattern Recognition, 2000, vol. 1, XP010533659, Sep. 3, 2000, pp. 762-765.
Johannes Burge, et al., "Optimal defocus estimation in individual natural images" PNAS, vol. 108, No. 40, Oct. 4, 2011, 13 Pages.
O. Cossairt, et al., "Spectral Focal Sweep: Extended Depth of Field from Chromatic Aberrations" ICCP 2010, 8 Pages.
Office Action issued Jun. 22, 2016, in Chinese Patent Application No. 201380014625.7.
Chinese Office Action dated Feb. 4, 2017 for Chinese Application No. 201380014625.7.

* cited by examiner

METHOD AND OPTICAL SYSTEM FOR DETERMINING A DEPTH MAP OF AN IMAGE

CROSS-REFERENCE TO RELATED APPLICATIONS

The present application is based on PCT/EP13/000847 filed Mar. 20, 2013, and claims the benefit of the earlier filing date of EP 12 002 701.6 filed in the European Patent Office on 18 Apr. 2012, the entire content of each of which application is incorporated herein by reference.

BACKGROUND

Field of the Disclosure

The present disclosure relates to a method and an optical system to determine a depth map of an image.

Description of Related Art

For several applications such as three-dimensional image formation, post-capture refocusing (Bokeh effect), gesture detection for user interfaces (UI) and extended depth of field systems there is a need for an improved method and an optical system to determine a depth map of an image.

SUMMARY

A method for determining a depth map of an image is proposed, comprising determining a first focus measure of a first colour in at least one region of the image; determining a second focus measure of a second colour in the at least one region of the image; determining a ratio of the first and the second focus measure; and determining the depth map based on a ratio of the first and second focus measure.

Further, an optical system for determining a depth map is provided, comprising a lens and a sensor to take an image; and a processor to determine a first focus measure of a first colour in at least one region of the image; to determine a second focus measure of a second colour in the at least one region of the image; to determine a ratio of the first and the second focus measure; and to determine the depth map based on a ratio of the first and second focus measure.

The foregoing paragraphs have been provided by way of general introduction, and are not intended to limit the scope of the following claims. The described embodiments, together with further advantages, will be best understood by reference to the following detailed description taken in conjunction with the accompanying drawings. The elements of the drawings are not necessarily to scale relative to each other.

BRIEF DESCRIPTION OF THE DRAWINGS

A more complete appreciation of the disclosure and many of the attended advantages thereof will be readily obtained as the same becomes better understood by reference to the following detailed description when considered in connection with the accompanying drawings, wherein.

DESCRIPTION OF THE EMBODIMENTS

Figure 1:
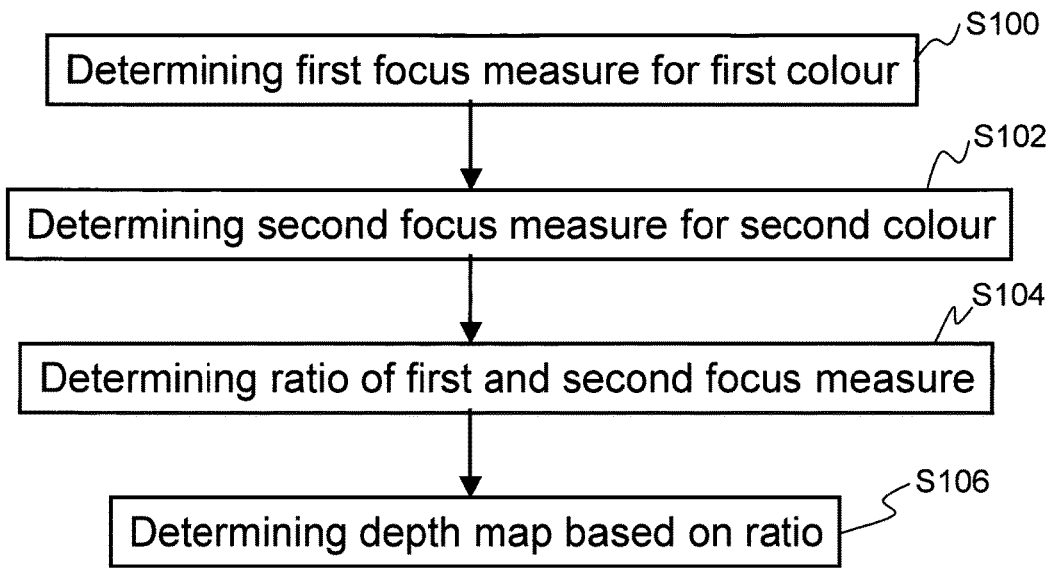
FIG. 1 describes a schematic flow diagram according to an embodiment of the invention.

Referring now to the drawings, wherein like reference numerals designate identical or corresponding parts throughout the several views, in FIG. 1 a schematic flow diagram of a method according to an embodiment is depicted.

In a step S100 a first focus measure for a first colour for at least a region of the image is determined. The first focus measure might be a value describing the sharpness of the image and might be determined by any known focus determination methods as e.g. gradient, variance, phase detection or contrast detection. "Focus measure" might be referred to in the following also as "blur measure".

Phase detection is achieved by dividing the incoming light into pairs of images and comparing them.

Contrast detection is achieved by measuring contrast within a sensor field, through the lens. The intensity difference between adjacent pixels of the sensor naturally increases with correct image focus. For autofocus (AF) systems, the optical system can thereby be adjusted until the maximum contrast is detected. In this method, AF does not involve actual distance measurement at all and is generally slower than phase detection systems, especially when operating under dim light.

Consequently the first focus measure describes the degree of focus of an image. Certain regions, e.g. with objects that were located within a depth of field when taking the image, are in-focus, whereas other regions (e.g. with objects that were located out of a depth of field when taking the image) might be out-of-focus.

In a step S102 a second focus measure is determined for a second colour of the at least one region of the image. The second focus measure might also be a value describing the sharpness of the image and might be determined by any known focus determination methods as e.g. gradient, variance, phase detection or contrast detection. Both, the first and the second focus measure might be determined by the same algorithm.

The at least one region of the image might be determined by a segmentation process in order to find out regions that belong to a same object.

In a step S104 a ratio of the first and the second focus measure is determined. The ratio might be calculated by dividing the first focus measure by the second focus measure or by dividing the second focus measure by the first focus measure.

The depth map is determined based on the determined ratio of the step S104 in step S106. The depth map might include an individual depth value for each of the pixels of an image, the depth value describing e.g. a distance from a lens of an imaging system, e.g. a camera, to an object. Consequently, the depth map includes the distances of the objects that are present in the image.

With the proposed method the information of longitudinal chromatic aberrations to estimate continuous depth using a single shot image is utilized. Chromatic aberration is a phenomenon in which different wavelengths of light (colours) focus at different distances due to dispersion in lenses. The focal length as a function of wavelength can be written as $$f(\lambda) = \frac{1}{(n(\lambda)-1)} \frac{(R1 \cdot R2)}{(R2-R1)} \quad (1)$$

where f=focal length of a single lens, n=refractive index (dependent on the wavelength λ), R1 and R2=radius of curvature of first and second lens surface, respectively.

Figure 2:
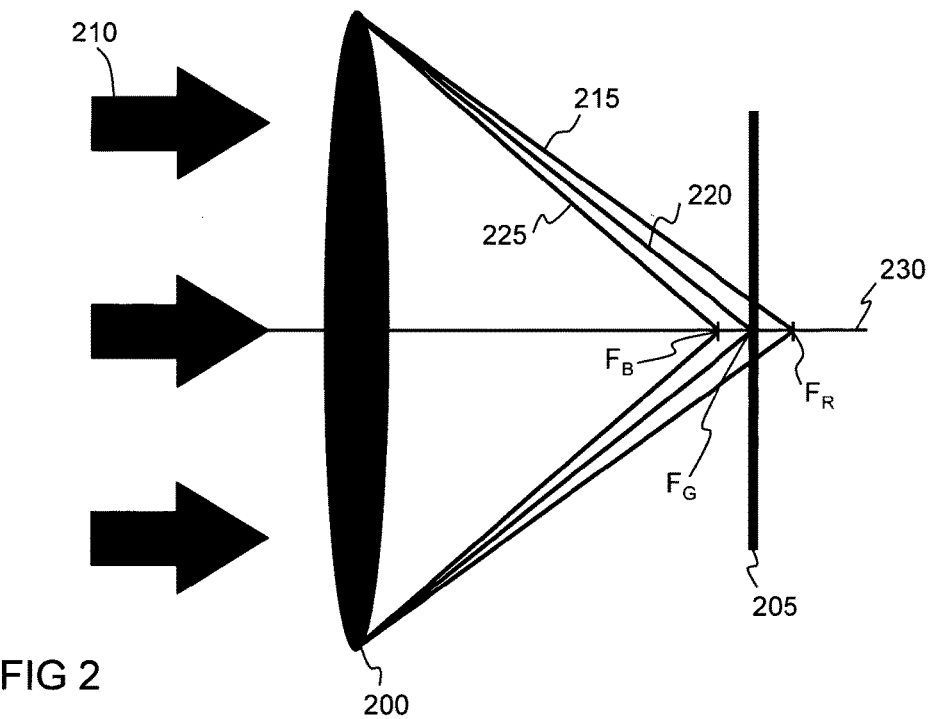
FIG. 2 shows an optical system including a lens with longitudinal chromatic aberration.

In FIG. 2 the phenomenon of longitudinal chromatic aberrations using a lens 200 and a sensor arrangement 205 of a typical optical system, e.g. a camera, is depicted. In FIG. 2 light 210 originating from an object focuses at different points. The red light 215 focuses on the optical axis 230 at a focal point FR, the green light 220 focuses on the optical axis 230 at a focal point FG and the blue light 225 focuses on the optical axis 230 at a focal point FB. In the depicted sensor arrangement in FIG. 2, the sensor 205 is located at the focal length for green light, hence, it can be observed, that in this example the focal point for the green light 220 is located at the plane of a sensor 205, the focal point FB for the blue light 225 is located on the optical axis 230 between the lens 200 and the sensor 205 and the focal point FR for the red light 215 is located on the optical axis 230 farther away from the lens 200 than the sensor 205.

Figure 3:
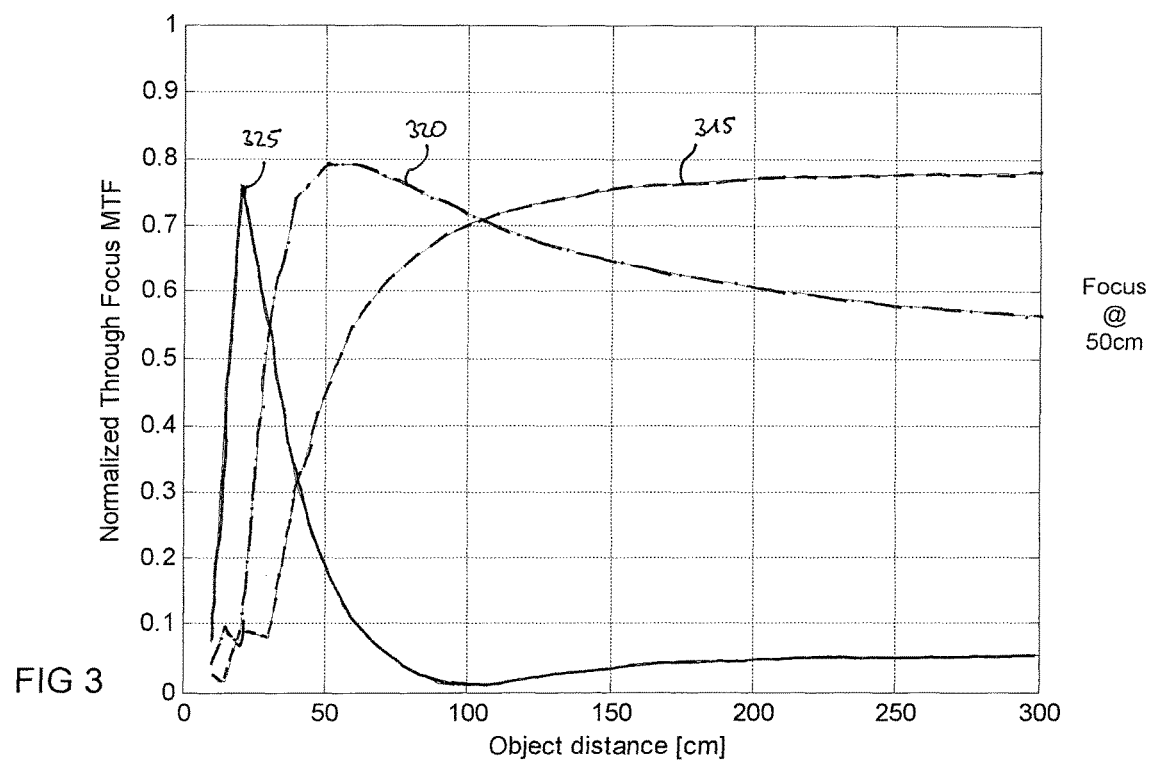
FIG. 3 shows schematically modulation transfer functions for different colours according to an embodiment of the invention.

This is further exemplified in FIG. 3 wherein the normalized through focus modulation transfer function (MTF) for 90 cycles per millimeter is depicted versus the object distance for a focus at 50 cm. The modulation transfer function (MTF) is the magnitude component of the optical transfer function (OTF) of an imaging system (camera, video system, microscope etc.), which is the true measure of resolution (image sharpness) that the system is capable of. The optical transfer function can be represented by a graph of light amplitude (brightness) and phase versus spatial frequency (cycles per picture width).

The modulation transfer function describes the ability of adjacent pixels to change from black to white in response to patterns of varying spatial frequency, and hence the actual capability to show fine detail, whether with full or reduced contrast.

In FIG. 3 the modulation transfer function MTF is depicted for red light 315, for green light 320 and for blue light 325. It can be observed that blue light is focusing for a near distance, green light is focusing for an intermediate distance and red light is focusing at the far distance.

It can also be observed from FIG. 3 that the ratio of the modulation transfer function between different colours changes with the object distance. This information can be used in order to estimate a continuous depth map, by calculating the ratio between the focus measure for the first and second colour and by determining from the modulation transfer function the object distance that corresponds to the determined ratio.

Using a third colour and correspondingly the ratios of focus measures for the first, second and third focus measures improves the precision of the calculated depth. Of course it is possible to use every calculated ratio or to use only one of the several ratios. The precision of the depth determination can be further improved by using further colours (e.g. infra-red).

With the proposed embodiment a low cost and reasonably precise system and method to estimate continuous depth using chromatic aberration is proposed. The estimated depth map can be used for several applications such as three-dimensional image formation, post capture refocusing, gesture detection for user interfaces (US) and extended depth of field systems. Furthermore, the estimated depth can be used to correct the chromatic aberration in order to enhance the image quality. Since the depth can be estimated from a single image the proposed method can also be used for moving pictures or video.

Compared to other methods to determine continuous depth as e.g. time of light imaging, stereo image systems, light field imaging systems, active illumination based methods, or passive ranging methods, the proposed embodiment is of low cost and of low computational complexity. No active light projection is required and it can be used for depth estimation for still images and videos.

Figure 4:
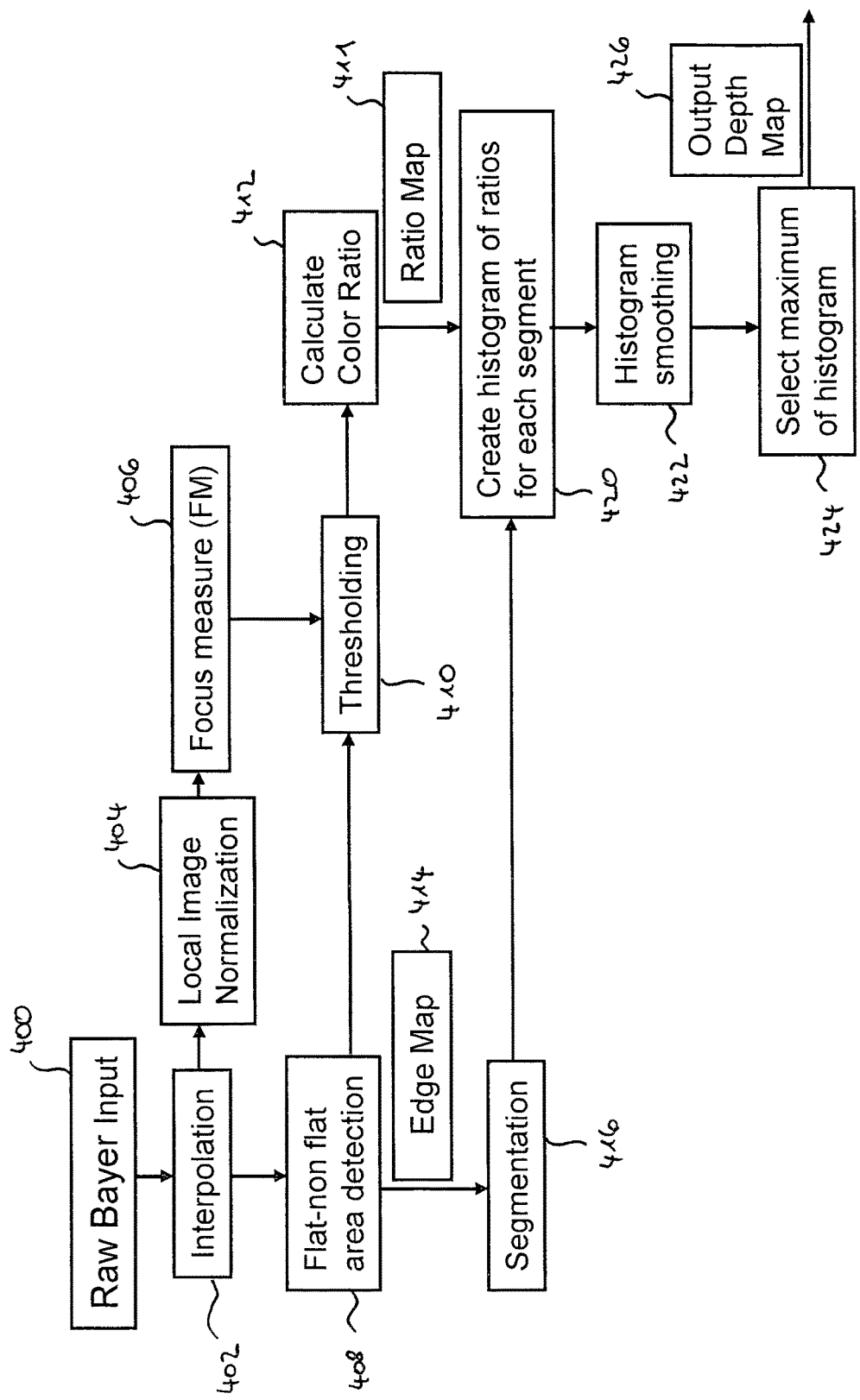
FIG. 4 shows a schematic block diagram of a part of an optical system according to an embodiment of the invention.

In FIG. 4 a block diagram is depicted for a further embodiment of the proposed method. Raw bayer input data 400 is interpolated in an interpolation step 402 in order to get full resolution red, green and blue data.

The step is followed by a local image normalization 404 that is used for comparing the sharpness of coloured edges.

Then, focus measure 406 is used to measure the sharpness of each colour component and it is applied on the normalized data from the local image normalization 404.

Further, the interpolated data from interpolation 402 is used to find edges in a non flat area detection 408 for instance by using minimum and maximum values or variance or any other method of edge detection.

A threshold is selected in thresholding step 410 for example by using sensor noise characteristics.

A color ratio map 411 is obtained by dividing the valued sharpness of two colours for instance between blue and green colour in a colour ratio calculating step 412.

An estimated edge map 414 resulting from the non-flat area detection 408 is provided to a segmentation step 416. Any robust image segmentation algorithm can be used for the purpose e.g. a watershed segmentation algorithm.

In a step 420 a histogram of ratios is created for each segment of the segmented image 418. The histogram is smoothed 422 and the maximum of the histogram is selected 424 in order to find the depth for this segment. In this way the continuous depth of a depth map 426 is calculated for all segments of an image.

Figure 5:
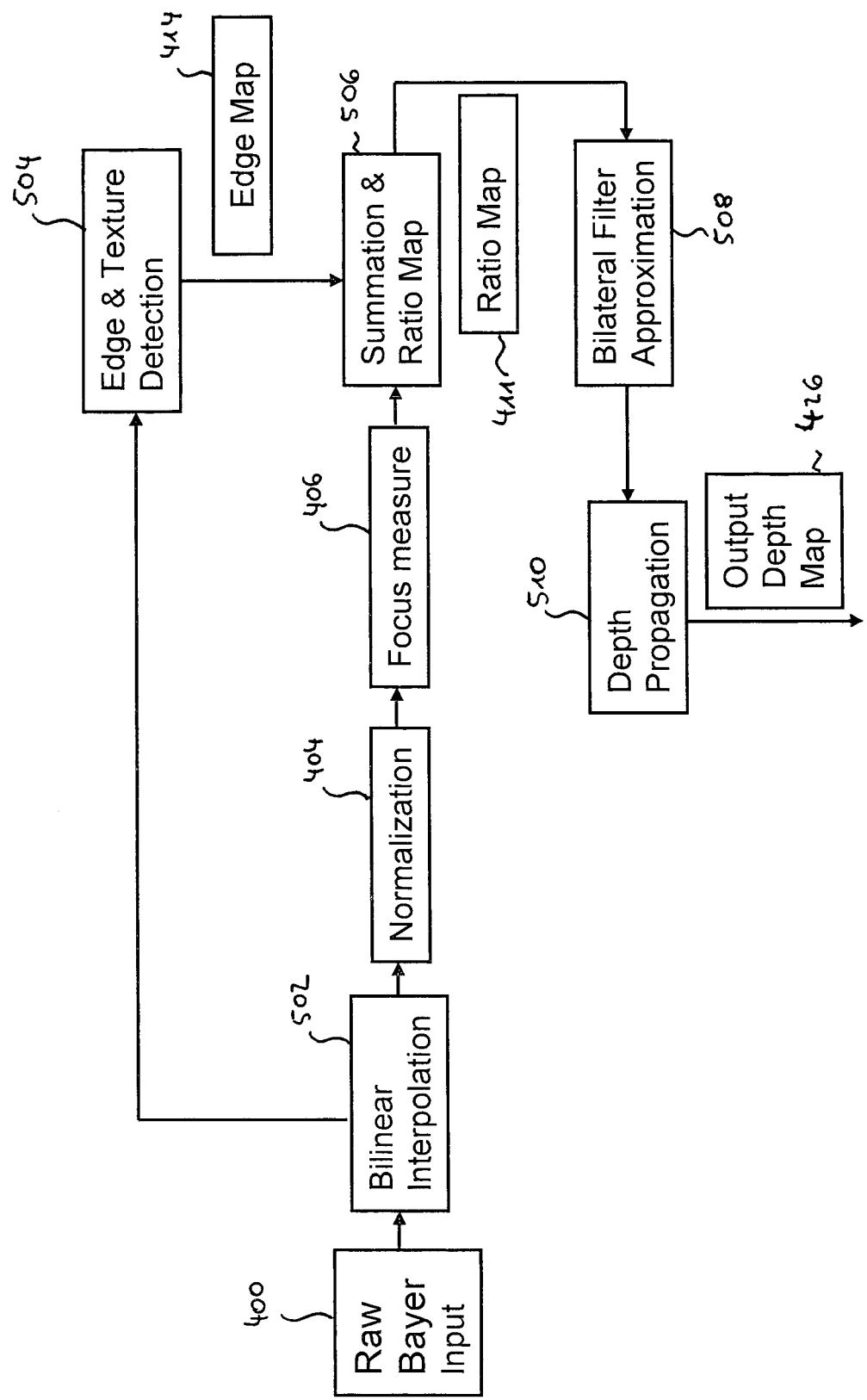
FIG. 5 shows a schematic block diagram of a part of an optical system according to a further embodiment of the invention.

A further embodiment is schematically depicted in FIG. 5. In this embodiment image segmentation is not used so that computational complexity can be reduced. Raw bayer input data 400 is first bilinearly interpolated 502 to get full resolution red, green and blue data.

This step is followed by the normalization 404 in order to compare the sharpness of the coloured edges.

The focus measure 406 is used to measure the sharpness of each colour component and it is applied on the normalized data from the normalization 404.

The bilinearly interpolated data is input in an edge and texture detection step 504 in order to derive an edge map 414.

In a summation and ratio map step 506 the edge map 414 and the focus measure 406 are combined in order to provide the ratio map 411.

The ratio map is filtered by using a cross or joint bilateral filter 408 or its approximation and then continuous depth is propagated 510 to all other areas of the image by interpolation.

Afterwards a depth map 426 is obtained. This embodiment is suitable for low cost applications such as mobile phone cameras.

Figure 6:
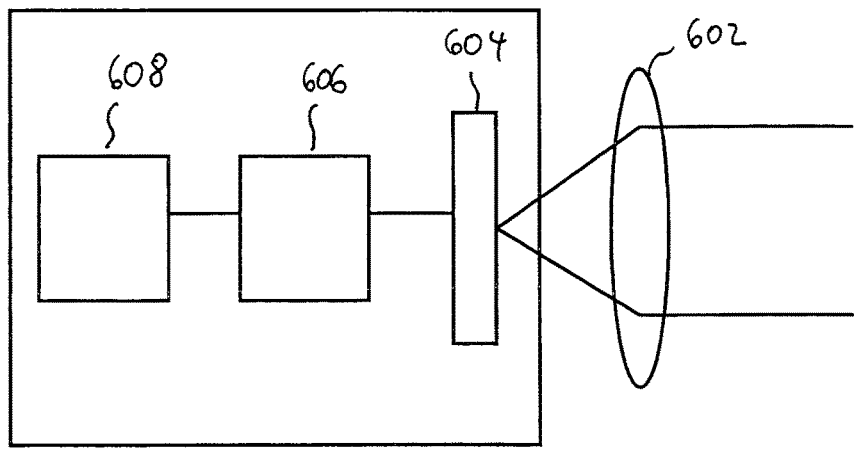
FIG. 6 shows a schematic block diagram of an optical system according to an embodiment of the invention.

In FIG. 6 an embodiment for a schematic optical system for determining a depth map is depicted. The optical system includes a lens 602 and a sensor 604 to take an image of an object. The optical system 600 further includes a processor 606 configured to determine a first focus measure of a first colour in at least one region of the image, to determine a second focus measure of a second colour in the at least one region, to determine a ratio of the first and second focus measure and to determine the depth map based on the ratio.

The optical system may further include a memory 608 to store a modulation transfer function or a calibration curve of the lens 602, which might be determined and/or simulated when manufacturing the optical system, and the processor 606 could be further configured to determine the depth based on the modulation transfer function or the calibration curve stored in the memory 608. A modulation transfer function might also be referred to as calibration curve.

The calibration curves might be generated for a step edge through a simulation framework taking into account influences of the optical system and the digital processing, for instance the focus position of the lens, the f-number of the lens, the distance from the image plane to the lens, the aperture diameter of the lens, the noise characteristics of the sensor, the sensor pixel size, the influence of axial chromatic aberrations.

The calibration curves can be calculated by using different ratios for e.g. three different colours. With calibration curves stored in the memory an absolute depth map can be generated, which covers the important image formation processes and results in a more accurate absolute depth.

With this embodiment the modulation transfer function or the calibration curve can be determined for each optical system 600 separately, e.g. when manufacturing the optical step and before shipping and selling it. An example for an optical system 600 might be a camera, e.g. a camera in a mobile phone.

One embodiment of the method might be realized as described in the following. When the depth is estimated from the edges in the image, normalization methods should balance the intensity of complete edge with a single factor so that a blur measure BM at each pixel of the edge is consistent. For that reason, the image is normalized with a difference of local maximum and minimum values, that is also referred to as "local contrast". If the local contrast is computed with a window size of equal to twice of the edge range, normalization of complete edge would be consistent. As computing the local contrast with minimum and maximum values is not robust in case of noise, a median filter is applied before computing local contrast and blur estimation.

After normalization, the blur amount is estimated with the summation of squared magnitude of gradients in four directions, horizontal, vertical and diagonals. Gradient operator is a bandpass filter that removes the DC value. Therefore, instead of normalizing the image, the gradient of the image with local contrast is normalized. In this way, there is no need to subtract mean or local minimum value from the image and gradient estimation would not be effected by noise introduced by normalization process. The blur estimate BMc, in local neighbourhood M×N of image I, is computed as $$BM_C = \frac{\sum_{x=1}^{M}\sum_{y=1}^{N}[\Delta I_C(x,y)]^2}{\left[\max_{x=1}^{M}\max_{y=1}^{N} I(x,y) - \min_{x=1}^{M}\min_{y=1}^{N} I(x,y)\right]^2} \quad (2)$$

where $\Delta I_c(x,y)$ is the gradient of any colour image $I_c$ in different directions.

The relative depth map is generated by taking the normalized ratios of blur measure values of different colours. Conventional colour sensors capture three colours red, green and blue. Therefore, three defocused images are generated for depth estimation, which makes it possible to estimate the depth for a larger distance range as when only two images are used. Hence, it is proposed to use the normalized ratio of all three colours to get a single depth map for a broader range, e.g. in the following way:

$$\text{depth} = \frac{BM_r^2 - (BM_b \times BM_g)}{BM_r^2 + (BM_b \times BM_g)} \quad (3)$$

where $BM_r$ is the blue measure for red, $BM_b$ is the blur measure for blue and $BM_g$ is the blur measure for green.

Figure 7:
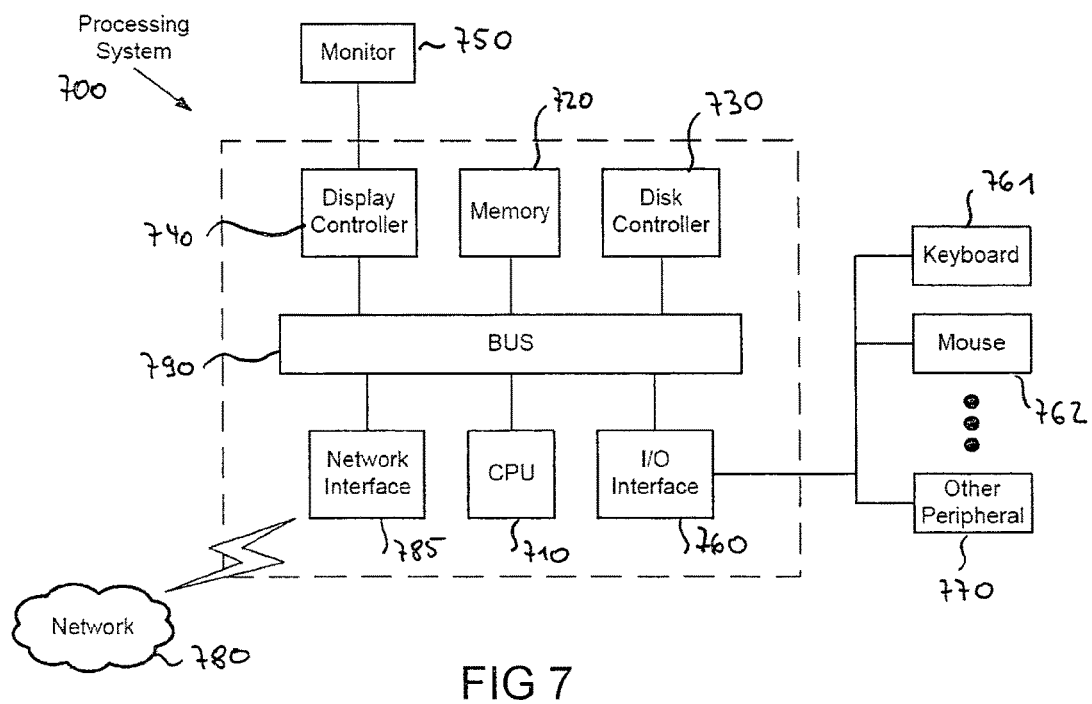
FIG. 7 shows a schematic block diagram according to a processing system of an embodiment of the present invention.

FIG. 7 is a hardware diagram of a processing system embodying aspects of this disclosure including aspects involving a computer. The processes, algorithms and electronically driven systems described herein can be implemented via a discrete control device or computing system consistence with the structure shown in FIG. 7. Such a system is described herein as a processing system 700. As shown in FIG. 7, the processing system 700 in accordance with this disclosure can be implemented using a microprocessor or its equivalent, such as a central processing unit (CPU) 710 or at least one application specific processor ASP (not shown). The microprocessor 710 utilizes a computer-readable storage medium, such as a memory 720 (e.g., ROM, EPROM, EEPROM, flash memory, static memory, DRAM, STRAM, and their equivalents), configured to control the microprocessor 710 to perform and/or control the processors and systems of this disclosure. Other storage mediums can be controlled via a controller, such as a disc controller 730, which controls a hard disc drive or optical disc drive.

The microprocessor 730 or aspects thereof, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU.

In another aspect, results of processing or the input of data in accordance with this disclosure can be displayed via a display controller 740 to a monitor 750. The display controller 740 would then preferably include at least one graphic processing unit for improved computational efficiency. Additionally, an I/O (input/output) interface 760 is provided for inputting data from a keyboard 761 or a pointing device as e.g. a computer mouse 762 for controlling parameters of the various processes and algorithms of this disclosure can be connected to the I/O interface 760 to provide additional functionality and configuration options, or control display characteristics. Moreover, the monitor 750 can be provided with a touch-sensitive interface to a command/instruction interface, and other peripherals 770 can be incorporated, including a scanner or a web cam when image-based data entry is used.

The above-noted components can be coupled to a network 780, as shown in FIG. 7, such as the Internet or a local intranet, via a network interface 785 for the transmission or reception of data, including controllable parameters. The network 780 provides a communication path to the mobile device, which can be provided by way of packets of data. Additionally, a central BUS 790 is provided to connect the above hardware components together and provides at least one path for digital communication there between.

A proposed system and method utilize chromatic aberrations as a useful tool for estimating continuous depth from single shot images. It also overcomes shortcomings and disadvantages of other approaches for depth estimation.

The method and system are of low computational complexity and can, therefore, be implemented in real time for processing both, images and videos. Furthermore, the proposed method and system output continuous depth maps that have a variety of applications, such as e.g. three-dimensional image creation, post capture refocusing, gesture detection for user interlaces and extended depth of field imaging.

Overall, the proposed method and system produced reasonably accurate continuous depth estimation results. This is achieved by calculating the sharpness ratio of different colours of normalized image data.

The proposed method works for real coloured images, since a normalized blur measure is determined. It is possible to optimize the designs of the optical system and the digital process in order to select the optimal parameters for the lens and the sensor pixel pitch.

The proposed method has the following advantages as compared to defocus/focus methods: generation of a depth map with a single shot is possible, no miss-registration errors occur, the method can be applied to videos without modifications as there is no need to change the focus mechanically, when using three defocused images (three colours) a larger depth range can be covered.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for determining a depth map of an image comprising:
   normalizing the image with a difference of local maximum and minimum values;
   determining a first focus measure of a first color in at least one region of the normalized image, the first focus measure corresponding to a first blur amount estimated by a first summation of squared magnitudes of gradients of the first color in multiple directions;
   determining a second focus measure of a second color in the at least one region of the normalized image, the second focus measure corresponding to a second blur amount estimated by a second summation of squared magnitudes of gradients of the second color in said multiple directions;
   determining a third focus measure of a third color in the at least one region of the normalized image, the third focus measure corresponding to a third blur amount estimated by a third summation of squared magnitudes of gradients of the third color in said multiple directions;
   determining a ratio including the first focus measure, the second focus measure, and the third focus measure; and
   determining the depth map based on the ratio including the first focus measure, the second focus measure, and the third focus measure.

2. The method according to claim 1 further comprising:
   generating an edge map of the image; and
   determining said at least one region of the image based on the edge map.

3. The method according to claim 1, further comprising:
   segmenting the image into segments; and
   determining said at least one region of the image based on said segmenting.

4. The method according to claim 3, further comprising:
   determining segments including edges; and
   determining the first focus measure, the second focus measure, and the third focus measure for the segments including edges.

5. The method according to claim 1, further comprising:
   determining the third focus measure of the third color in at least one segment; and
   determining a distance based on a ratio of the first focus measure and the third focus measure.

6. The method according to claim 1, further comprising:
   determining a calibration curve for the first color, the second color, and the third color for a lens of a camera;
   storing the calibration curve;
   taking the image with the camera; and
   determining the depth map based on the calibration curve.

7. The method according to claim 1, further comprising:
   interpolating color information of the image between pixels of the image prior to determining the first focus measure, the second focus measure, and the third focus measure.

8. The method according to claim 7, further comprising:
   normalizing the color information prior to determining the first focus measure, the second focus measure, and the third focus measure.

9. The method according to claim 2, further comprising:
   determining a ratio map based on the first focus measure, the second focus measure, and the third focus measure and based on the edge map; and
   determining the depth map based on a bilateral filter approximation of the ratio map and a depth propagation.

10. The method according to claim 1, wherein the local maximum and minimum values are computed with a window size of equal to twice of an edge range.

11. The method according to claim 3, further comprising:
    generating a histogram of ratios for each segment of the segmented image.

12. The method according to claim 11, further comprising:
    smoothing the histogram; and
    selecting a maximum value of the histogram to find a corresponding depth of a corresponding segment.

13. The method according to claim 6, wherein the calibration curve is determined based on at least one of a focus position of the lens, a f-number of the lens, a distance from an image plane to the lens, an aperture diameter of the lens, noise characteristics of a sensor, a sensor pixel size, and an influence of axial chromatic aberrations.

14. The method according to claim 1, further comprising:
    normalizing a gradient of the image with a local contrast.

15. The method according to claim 14, wherein
    the gradient of the image is computed horizontally, vertically, and diagonally.

16. The method according to claim 1, wherein
    the ratio corresponds to an equation $(BM_r^2-(BM_b \times BM_g))/(BM_r^2+(BM_b \times BM_g))$, and
    $BM_r$ is the first blur amount, $BM_b$ is the second blur amount, and $BM_g$ is the third blur amount.

17. An optical system for determining a depth map comprising:
    a lens and a sensor to take an image; and
    processing circuitry configured:
      to normalize the image with a difference of local maximum and minimum values;
      to determine a first focus measure of a first color in at least one region of the normalized image, the first focus measure corresponding to a first blur amount estimated by a first summation of squared magnitudes of gradients of the first color in multiple directions;

to determine a second focus measure of a second color in the at least one region of the normalized image, the second focus measure corresponding to a second blur amount estimated by a second summation of squared magnitudes of gradients of the second color in said multiple directions;

to determine a third focus measure of a third color in the at least one region of the normalized image, the third focus measure corresponding to a third blur amount estimated by a third summation of squared magnitudes of gradients of the third color in said multiple directions;

to determine a ratio including the first focus measure, the second focus measure, and the third focus measure; and to determine the depth map based on the ratio including the first focus measure, the second focus measure, and the third focus measure.

18. The optical system according to claim 17, further comprising:

a memory to store a calibration curve of the lens, wherein the processing circuitry is further configured to determine the depth map based on the calibration curve.

19. The optical system according to claim 17, wherein the optical system is a camera.

20. A non-transitory computer-readable storage medium including computer-program instructions, which when executed by a computer, cause the computer to perform a method for determining a depth map of an image, the method comprising:

normalizing the image with a difference of local maximum and minimum values;

determining a first focus measure of a first color in at least one region of the normalized image, the first focus measure corresponding to a first blur amount estimated by a first summation of squared magnitudes of gradients of the first color in multiple directions;

determining a second focus measure of a second color in the at least one region of the normalized image, the second focus measure corresponding to a second blur amount estimated by a second summation of squared magnitudes of gradients of the second color in said multiple directions;

determining a third focus measure of a third color in the at least one region of the normalized image, the third focus measure corresponding to a third blur amount estimated by a third summation of squared magnitudes of gradients of the third color in said multiple directions;

determining a ratio including the first focus measure, the second focus measure, and the third focus measure; and determining the depth map based on the ratio including the first focus measure, the second focus measure, and the third focus measure.

* * * * *